United States Patent [19]
Walters et al.

[11] Patent Number: 6,033,515
[45] Date of Patent: Mar. 7, 2000

[54] USE OF A LASER TO FUSION-SPLICE OPTICAL COMPONENTS OF SUBSTANTIALLY DIFFERENT CROSS-SECTIONAL AREAS

[75] Inventors: William P. Walters, Peralta; Mark A. Fitch; Paul Fournier, both of Albuquerque; Marc Farrell Harris, Tijeras, all of N. Mex.; Pierre Bernard, St-Augustin-de-Desmaures, Canada

[73] Assignee: LightPath Technologies, Inc., Albuquerque, N.Mex.

[21] Appl. No.: 09/118,033

[22] Filed: Jul. 17, 1998

[51] Int. Cl.$^7$ .............................. B32B 31/28; G02B 6/255
[52] U.S. Cl. ...................................... 156/272.8; 156/273.3; 156/304.6; 385/51; 385/96; 65/406; 219/121.63; 219/121.82
[58] Field of Search ................................ 156/158, 272.8, 156/273.3, 304.2, 304.6, 308.2, 309.9; 219/121.6, 121.63, 121.64, 121.82, 121.85; 385/33, 34, 51, 95, 96, 97, 98; 65/392, 406, 407, 36, 42

[56] References Cited

U.S. PATENT DOCUMENTS

| | | | |
|---|---|---|---|
| 4,737,006 | 4/1988 | Warbrick | 350/96.18 |
| 4,962,988 | 10/1990 | Swann | 385/34 |
| 5,299,274 | 3/1994 | Wysocki et al. | 385/96 |
| 5,745,311 | 4/1998 | Fukuoka et al. | 385/95 |

OTHER PUBLICATIONS

L. Rivoallan et al, "Fusion Splicing Of Fluoride Glass Optical Fibre With $CO_2$ Laser", *Electronics Letters*, vol. 24, No. 12, Jun. 9, 1988, pp. 756–757.

N. Shimizu et al, "Fusion Splicing Between Optical Circuits And Optical Fibres", *Electronics Letters*, vol. 19, No. 3, Feb. 3, 1983, pp. 96–97.

L. Rivoallan et al, "Monomode Fibre Fusion Splicing With $CO_2$ Laser", *Electronics Letters*, vol. 19, No. 2, Jan. 20, 1983, pp. 54–55.

H. Uetsuka et al, "Unique Optical Bidirectional Module Using A Guided–Wave Multiplexer/Demultiplexer", *Technical Digest*, OFC'93, pp. 248–249.

T. Shiota et al, "Improved Optical Coupling Between Silica–Based Waveguides And Optical Fibers", *Technical Digest*, OFC'94, pp. 282–283.

*Primary Examiner*—Michael W. Ball
*Assistant Examiner*—Michael A Tolin
*Attorney, Agent, or Firm*—Benman & Collins

[57] ABSTRACT

A method is provided for fusion-splicing with a laser beam two optical components, one of the optical components (e.g., an optical element such as a lens) having a surface that has a comparatively larger cross-sectional area than a surface of the other optical component (e.g., an optical fiber). The method comprises: (a) aligning the two optical components along one axis; (b) turning on a directional laser heat source to form the laser beam; (c) directing the laser beam to be collinear with that optical component having a smaller cross-sectional area; (d) ensuring that the laser beam strikes the surface of the optical component having the larger cross-sectional area at normal or near normal incidence so that absorption of the laser beam is much more efficient on the surface; (e) adjusting the power level of the laser beam to reach a temperature equal to or higher than the softening temperature of the surface of the optical component having the larger cross-sectional area to form a softening region thereon, thereby achieving the fusion-splicing; and (f) turning off the laser.

26 Claims, 1 Drawing Sheet

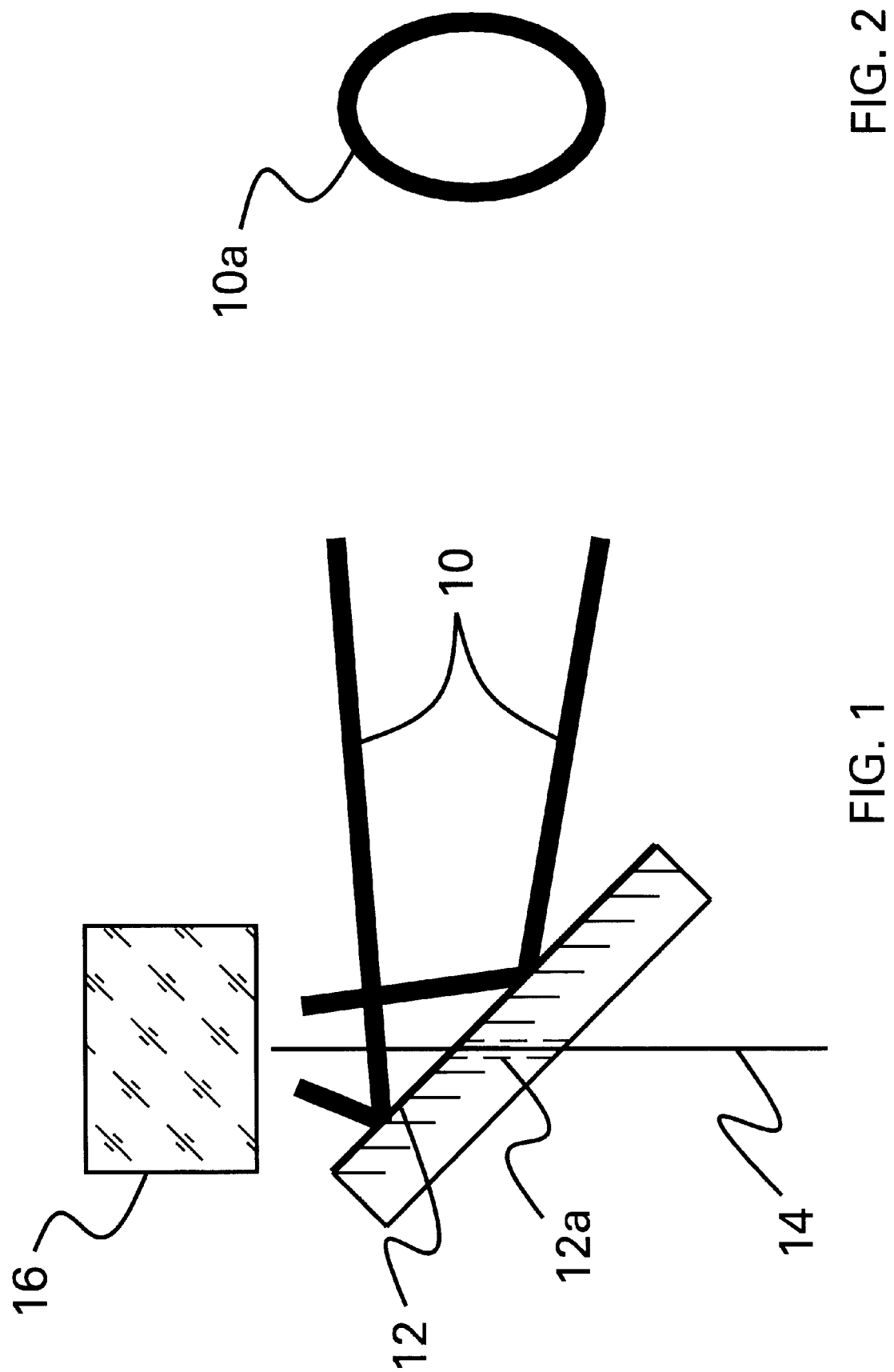

USE OF A LASER TO FUSION-SPLICE OPTICAL COMPONENTS OF SUBSTANTIALLY DIFFERENT CROSS-SECTIONAL AREAS

TECHNICAL FIELD

The present invention relates generally to optoelectronics involving optical components and, more particularly, to coupling optical components together of significantly different cross-sectional areas, such as coupling optical fibers to optical elements such as lenses, filters, gratings, prisms, and the like.

BACKGROUND ART

Splicing of one optical fiber to another or of one optical fiber to an optical waveguide is known. Such splicing can be done by a variety of techniques, including fusion-splicing, which involves localized melting in the region of the splice.

The following references disclose fusion-splicing of fiber to fiber or fiber to silica-waveguide: (1) R. Rivoallan et al, "Monomode fibre fusion-splicing with $CO_2$ laser", Electronics Letters, Vol. 19, No. 2, pp.54–55, 1983; (2) R. Rivoallan et al, "Fusion-splicing of fluoride glass optical fibre with $CO_2$ laser", Electronics Letters, Vol. 24, No. 12, pp.756–757, 1988; (3) N. Shimizu et al, "Fusion-splicing between optical circuits and optical fibres", Electronics Letters, Vol. 19, No. 3, pp.96–97, 1983; (4) T. Shiota et al, "Improved optical coupling between silica-based waveguides and optical fibers", OFC'94 Technical Digest, pp.282–283; and (5) H. Uetsuka et al, "Unique optical bidirectional module using a guided-wave multiplexer/demultiplexer", OFC'93 Technical Digest, p. 248–249. In both cases (fiber-fiber or fiber-waveguide), the masses to fuse are very small and of similar size. The fusion does not require careful thermal balance between the two components involved and can be done with a laser beam impinging from the side.

U.S. Pat. No. 4,737,006 entitled "Optical Fiber Termination Including Pure Silica Lens And Method Of Making Same", issued to K. J. Warbrick on Apr. 12, 1988, discloses fusion-splicing an undoped (pure) silica rod to a single mode fiber to fabricate a collimator, employing an electric arc. However, this is an extremely complicated method and has limited applications.

The present practice in the art often requires the attachment of optical fibers to other optical elements such as lenses, filters, gratings, prisms, and other components which have a much larger cross-sectional area than the optical fibers. The most often utilized processes for attaching optical fibers to the larger optical elements include (1) bonding the fiber faces directly to the optical element with adhesives or (2) engineering a complex mechanical housing which provides stable positioning of air-spaced fibers and optical elements throughout large changes in environmental conditions.

The use of adhesives in the optical path of such devices is undesirable due to the chance of degradation of the adhesive over time. On the other hand, spacing the fibers a fixed distance away from the optical elements by utilizing complex mechanical housings requires the use of anti-reflection coatings at all air-glass interfaces in order to minimize losses of optical energy through the device. The presence of air-glass interfaces also provides a source of back-reflected light into the optical fibers. This back-reflected light is a source of noise in many communication networks, and effectively limits transmission bandwidth of such communication networks.

In previous art, it has been shown that positioning an angle cleaved fiber or polished fiber in proximity to the angle polished face of a collimating lens results in excellent collimation and excellent performance characteristics. However, these existing technologies for assembling collimators require very labor intensive active alignment techniques. The alignment techniques include manipulating the position of the fiber relative to the lens in three linear axes and three rotational axes during final assembly. If a collimator can be built that effectively makes the fiber and the lens a single piece, then alignment can be reduced to two linear and two rotational axes during the fusion process and there is no need for alignment during final assembly, thereby reducing costs dramatically.

A key performance parameter to be minimized in collimator assemblies is back reflection of light down the fiber. By butt-coupling or fusion-splicing a fiber to a lens of the same refractive index, there is no apparent interface to cause back reflection. The beam is then allowed to diverge in the lens and does not see an index break surface until it exits the lens. By then, the beam is so diffused that the amount of light that can return to the fiber core is extremely small.

Many advances can be made in the optoelectronics and telecommunications markets if one is able to fusion-splice a single mode optical fiber directly to a collimating lens, a filter, a grating, a prism, a wavelength division multiplexer (WDM) device, or any other optical component of comparatively larger cross-sectional area. More generally, these advances can be made if one is able to fuse optical components of substantially different cross-sectional areas.

Thus, a need remains for a method of fusion-splicing optical components of significantly different cross-sectional areas.

DISCLOSURE OF INVENTION

In accordance with the present invention, such a method is provided for fusion-splicing optical components with significantly different cross-sectional areas using a laser. By "significantly different" is meant a difference of at least two times.

The method of the present invention for fusion-splicing with a laser beam two optical components, one of the optical components having a surface that has a comparatively larger cross-sectional area than a surface of the other optical component, comprises:

(a) aligning the two optical components along one axis;

(b) turning on a directional laser heat source to form the laser beam;

(c) directing the laser beam to be collinear with that optical component having a smaller cross-sectional area;

(d) ensuring that the laser beam strikes the surface of the optical component having the larger cross-sectional area at normal or near normal incidence so that absorption of the laser beam is much more efficient on the surface;

(e) adjusting the power level of the laser beam to reach a temperature equal to or higher than the softening temperature of the surface of the optical component having the larger cross-sectional area to form a softening region thereon, which then softens, thereby achieving the fusion-splicing; and (f) turning off the laser heat source.

The method of the invention is particularly useful for fusion-splicing an optical fiber to an optical element, such as a lens, having a much larger cross-sectional area. In the case of the present invention, the difference in cross-sectional areas between the optical fiber and the optical element is at least about two times, and typically at least about ten times, although the present invention is not so limited.

Seamlessly fusing the optical fibers to the optical elements, as defined herein, negates the need for both adhesives and complicated housings. Additionally, such fusing eliminates the source of back-reflected light, and requires no additional anti-reflective coatings between optical fibers and optical elements. The present invention represents a substantial improvement to optoelectronic assembly, and allows such devices to be manufactured at significantly lower costs than currently achievable.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

FIG. 1 is a side elevational view, showing schematically the apparatus employed in the practice of the present invention; and FIG. 2 is a view of an annular laser beam as it appears on the surface of a mirror through which the optical fiber is passed.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

Localized heat has been effectively used in a variety of glass processing operations including surface polishing, fiber drawing, and fusion-splicing. The heat source used is frequently a simple resistance heater or a controlled arc. All of the aforementioned processes can also be performed using a laser as a heat source.

Prior to the present invention, however, a method for splicing optical components of substantially different cross-sectional areas had not been developed, to the knowledge of the inventors. The present invention is directed to a method to form seamlessly fused monolithic pieces.

To fuse optical components of substantially different cross-sectional areas, in one embodiment, the larger surface is first pre-heated by the laser. The pre-heat temperature is just sufficient to polish and melt the surface of the larger component at the location one desires to fuse the smaller component. Depending upon the size, it may be a heating of the entire surface or only a localized heating. The second surface is then brought into contact with the preheated surface and, once the thermal exchange is established (by conduction of heat), the two components are heated simultaneously. If both surfaces are large (large with respect to the localized heating zone), then both may need preheating. Once the surfaces are in contact at the appropriate elevated temperatures, fusion occurs. The fusion temperature is just enough above the softening temperature to ensure a good flow of thermal energy between the two components.

In a second embodiment, the fusion occurs starting with contact of the two optical components and the components are never separated during the fusion-splicing.

In a third embodiment, the optical components are brought into contact, then pulled back after alignment, and then fusion-spliced as in the first embodiment.

Qualification of the interface is accomplished by measuring the back reflection of light through the system as well as mechanical testing.

There are no practical limitations in using this technique with respect to size mismatch, or the absence of a mismatch, or in cross-sectional geometry.

Any two pieces of optical elements, whether comprising an inorganic glass or an organic polymer, can be fused using the method of the present invention. The most common application will be fusion of single mode fibers to optoelectronic or telecommunications devices. Fusion-splicing in accordance with the teachings herein virtually eliminates back-reflection and the associated losses. It is also very cost-effective, with a splice requiring a few seconds or less and the process can be fully automated. Splicing eliminates the need for active alignment in many instances. Splicing also ablates contaminants and precludes the need for foreign materials, such as adhesives and other organic materials, in the optical path.

Optical inorganic glasses, such as silicas, borosilicates, borates, phosphates, aluminates, chalcogenides and chalcohalides, halides, etc., and optical organic polymers, such as acrylates, methacrylates, vinyl acetates, acrylonitriles, styrenes, etc., may be beneficially employed in the practice of the present invention, although the invention is not limited to the specific classes of materials listed.

Because the heating is quick and localized, components can be anti-reflection-coated on surfaces other than the surface to be fused prior to fusion. The process of the present invention also minimizes the number of coated surfaces. Typical assembly techniques leave a minimum of three surfaces to be coated: the fiber face and both the input and output faces of the lens. However, the process of the present invention leaves as few as one surface because two surfaces are combined into a monolithic fused piece. Every surface, even when coated, contributes losses to the system because there is no perfect antireflection coating. Thus, reducing the number of surfaces to be coated reduces losses to the system.

Pointing accuracy and beam quality can be monitored prior to fusion and locked in due to fusion. Because the part count and the labor intensity of the process is minimized, costs are very low.

Elimination of angled surface index breaks reduces polarization effects such as polarization-dependent losses (PDL) and polarization mode dispersion (PMD) in fabricated components. Current methods employ optical surfaces which are angled relative to the optical axis in order to control back reflection, thereby inducing PDL and PMD above those inherent in the materials.

Another distinct advantage of the present invention is the thermal stability of the system. Because the parts are seamlessly fused into a monolithic piece, there is no dependence on the housing for maintaining sub-micron spacing tolerances as there is with other prior art approaches in optoelectronic and telecommunications devices.

The present invention makes possible a very high quality and low cost product for the optoelectronics/telecommunications industry. Without this technology, one would be forced to use the prior art techniques known in the telecommunications industry, which are very costly, cannot perform as well, and/or use undesirable materials in the optical path.

The novel method of the present invention for splicing small cross-sectional area optical component (e.g., optical fiber) to larger cross-sectional area optical component (e.g., optical element) comprises:

1. aligning the optical fiber and the optical element on the same axis;
2. turning on a directional laser heat source (such as an infrared laser) to form a laser beam;
3. directing the laser beam to be collinear with the fiber (this way, most of the laser light is not absorbed by the small fiber but is reflected off surface because the reflection coefficient is very high at grazing incidence);
4. ensuring that the laser beam strikes the larger cross-sectional area optical element at normal or near normal incidence so that absorption of the laser is much more efficient on the larger surface;
5. adjusting the laser power level to reach a temperature equal to or higher than the softening temperature on the surface of the element to achieve fusion-splicing (and simultaneously achieve polishing and contamination ablation); and
6. turning off the laser.

In the first embodiment, the two components are aligned but separated by a space (typically a few millimeters), the laser beam is turned on to form the softening region, and the surface of the optical component having the smaller cross-sectional area is brought in contact with the softening region of the optical component having the larger cross-sectional area, the contact resulting in heat transfer to the surface of the optical component having the smaller cross-sectional area, which then softens, thereby achieving the fusion-splicing.

In the second embodiment, the two components are first brought into contact and the laser beam is then turned on to form the softening region where the two components are in contact to achieve the fusion-splicing.

In the third embodiment, the two components are aligned, then brought into contact, then separated by a space (typically a few millimeters), the laser beam is turned on to form the softening region, and the surface of the optical component having the smaller cross-sectional area is brought in contact with the softening region of the optical component having the larger cross-sectional area, the contact resulting in heat transfer to the surface of the optical component having the smaller cross-sectional area, which then softens, thereby achieving the fusion-splicing.

For fusion-splicing typical inorganic glasses, such as silica, a $CO_2$ laser, which operates in the range 9 to 11 $\mu$m, is preferred, since silica-based glasses have very large absorption coefficient. Other optical materials typically have a large absorption in the infrared, and accordingly, lasers operating in another region of the IR spectrum may be used with such other optical materials.

The laser beam is collinear and grazes the fiber. This can be accomplished in many ways. For example, a 45-degree mirror with a central hole is used to redirect the laser beam along the axis of the fiber (the fiber passes through the hole). Other methods that direct the laser beam along the axis of the fiber may also be employed; such methods are well-known to those skilled in this art. The laser beam itself can be (but not necessarily) annular in shape. This last requirement is accomplished by different techniques: scanning system, special optical components (axicon), $TEM_{01}$ laser mode, central obstruction, diffractive optical element, etc. The same effect could be accomplished by using two or more laser beams, all collinear with the optical fiber.

The two optical components being fusion-spliced preferably have similar thermal and/or mechanical properties. However, this is not a necessary requirement, since dissimilar optical components can be fusion-spliced employing the teachings of the present invention. In such cases, the possibility of strain due to the process may cause the splice to break if the conditions are not right, and thus must be taken into account. However, such a consideration is well within the experience of the person skilled in this art, and no undue experimentation is required.

FIG. 1 depicts the laser beam 10 impinging on the mirror 12, which has a hole 12a therethrough. The optical fiber 14 passes through the hole 12a in the mirror 12 and is fusion-spliced to the optical element 16. FIG. 1 depicts the optical fiber 14 just prior to fusion-splicing to the lens 16. FIG. 2 depicts an annular laser beam 10a in cross-section. The optical element 16 may be a lens, filter, grating, prism, WDM device, or other such optical component to which it is desired to secure the optical fiber 14.

The technology disclosed herein can be applied to conventional fiber collimators, expanded beam collimators, WDM products, and any other device that has a glass or polymer attachment site. One is no longer limited to fusing components that only have substantially similar diameters.

INDUSTRIAL APPLICABILITY

The method of the invention is expected to find use in fusion-splicing two optical components together of dissimilar cross-sectional areas, such as splicing an optical fiber to an optical lens.

Thus, there has been disclosed a method for fusion-splicing two optical components together of dissimilar cross-sectional areas, such as splicing an optical fiber to an optical element. It will be readily apparent to those skilled in this art that various changes and modifications of an obvious nature may be made, and all such changes and modifications are considered to fall within the scope of the present invention, as defined by the appended claims.

What is claimed is:

1. A method for fusion-splicing two optical components with a laser beam, one of said optical components having a surface that has a comparatively larger cross-sectional area than a surface of the other optical component, comprising:
   (a) aligning said two optical components along one axis;
   (b) turning on a directional laser heat source to form said laser beam;
   (c) directing said laser beam to be collinear with that optical component having a smaller cross-sectional area;
   (d) ensuring that said laser beam strikes said surface of said optical component having said larger cross-sectional area at normal or near normal incidence so that absorption of said laser beam is much more efficient on said surface;
   (e) adjusting the power level of said laser beam to reach a temperature equal to or higher than the softening temperature of said surface of said optical component having said larger cross-sectional area to form a softening region thereon, thereby achieving said fusion-splicing; and
   (f) turning off said laser heat source.

2. The method of claim 1 wherein said larger cross-sectional area is at least two times larger than said smaller cross-sectional area.

3. The method of claim 2 wherein said larger cross-sectional area is at least ten times larger than said smaller cross-sectional area.

4. The method of claim 1 wherein said two optical components comprise silica-based glasses.

5. The method of claim 4 wherein said laser operates in a wavelength region of about 9 to 11 $\mu$m.

6. The method of claim 5 wherein said laser is a $CO_2$ laser.

7. The method of claim 1 wherein said optical component having said larger cross-sectional area is an optical element.

8. The method of claim 1 wherein said optical component having said smaller cross-sectional area is an optical fiber.

9. The method of claim 8 wherein said directing of said laser beam to be collinear with said optical component having said smaller cross-sectional area is achieved by providing a mirror having a hole therethrough, through which said optical fiber passes.

10. The method of claim 9 wherein said mirror is inclined at 45-degrees with respect to said optical fiber.

11. The method of claim 1 wherein said two components are aligned but separated by a space, said laser beam is turned on to form said softening region, and said surface of said optical component having said smaller cross-sectional area is brought in contact with said softening region of said optical component having said larger cross-sectional area, said contact resulting in heat transfer to said surface of said optical component having said smaller cross-sectional area, which then softens, thereby achieving said fusion-splicing.

12. The method of claim 1 wherein said two components are first brought into contact and said laser beam is then turned on to form said softening region where said two components are in contact to achieve said fusion-splicing.

13. The method of claim 1 wherein said two components are aligned, then brought into contact, then separated by a space, said laser beam is turned on to form said softening region, and said surface of said optical component having said smaller cross-sectional area is brought in contact with said softening region of said optical component having said larger cross-sectional area, said contact resulting in heat transfer to said surface of said optical component having said smaller cross-sectional area, which then softens, thereby achieving said fusion-splicing.

14. A method for fusion-splicing an optical fiber and an optical element with a laser beam, said optical element having a surface that has a comparatively larger cross-sectional area than a surface of said optical fiber, comprising:

(a) aligning said optical fiber and said optical element along one axis;

(b) turning on a directional laser heat source to form said laser beam;

(c) directing said laser beam to be collinear with said optical fiber;

(d) ensuring that said laser beam strikes said surface of said optical element at normal or near normal incidence so that absorption of said laser beam is much more efficient on said surface;

(e) adjusting the power level of said laser beam to reach a temperature equal to or higher than the softening temperature of said surface of said optical element to form a softening region thereon, thereby achieving said fusion-splicing; and (f) turning off said laser heat source.

15. The method of claim 14 wherein said cross-sectional area of said optical element is at least two times larger than that of said optical fiber.

16. The method of claim 15 wherein said cross-sectional area of said optical element is at least ten times larger than that of said optical fiber.

17. The method of claim 14 wherein said optical element and said optical fiber each comprise silica-based glasses.

18. The method of claim 17 wherein said laser operates in a wavelength region of about 9 to 11 $\mu$m.

19. The method of claim 18 wherein said laser is a $CO_2$ laser.

20. The method of claim 14 wherein said directing of said laser beam to be colinear with said optical fiber is achieved by providing a mirror having a hole therethrough, through which said optical fiber passes.

21. The method of claim 20 wherein said mirror is inclined at 45-degrees with respect to said optical fiber.

22. The method of claim 14 wherein both said optical element and said optical fiber have similar thermal and mechanical properties.

23. The method of claim 14 wherein said optical element is selected from the group consisting of lenses, filters, gratings, prisms, and wavelength division multiplexer devices.

24. The method of claim 14 wherein said optical element and said optical fiber are aligned but separated by a space, said laser beam is turned on to form said softening region, and said surface of said optical fiber is brought in contact with said softening region of said optical element, said contact resulting in heat transfer to said surface of said optical fiber, which then softens, thereby achieving said fusion-splicing.

25. The method of claim 14 wherein said optical element and said optical fiber are first brought into contact and said laser beam is then turned on to form said softening region where said optical fiber contacts said optical element to achieve said fusion-splicing.

26. The method of claim 14 wherein said optical element and said optical fiber are aligned, then brought into contact, then separated by a space, said laser beam is then turned on to form said softening region, and said surface of said optical fiber is brought in contact with said softening region of said optical element, said contact resulting in heat transfer to said surface of said optical fiber, which then softens, thereby achieving said fusion-splicing.

* * * * *